United States Patent
Axelrod et al.

(10) Patent No.: US 8,227,007 B2
(45) Date of Patent: Jul. 24, 2012

(54) DIRECT MELT PROCESSING OF RESINS

(75) Inventors: Glen S. Axelrod, Colts Neck, NJ (US); Ajay Gajria, Monmouth Junction, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 990 days.

(21) Appl. No.: 11/251,261

(22) Filed: Oct. 14, 2005

(65) Prior Publication Data

US 2007/0031556 A1    Feb. 8, 2007

Related U.S. Application Data

(63) Continuation-in-part of application No. 11/198,881, filed on Aug. 5, 2005.

(51) Int. Cl.
*A23P 1/10*    (2006.01)

(52) U.S. Cl. ........ 426/549; 426/578; 426/512; 426/520; 426/805; 425/587; 119/710

(58) Field of Classification Search .......... 426/512–513, 426/515, 519, 520, 805, 578, 549; 425/542, 425/585–587; 119/710
See application file for complete search history.

(56) References Cited

U.S. PATENT DOCUMENTS

| | | | | |
|---|---|---|---|---|
| 4,000,884 A | * | 1/1977 | Chung | 366/88 |
| 4,076,846 A | | 2/1978 | Nakatsuka et al. | |
| 4,079,463 A | * | 3/1978 | Miller | 366/89 |
| 4,255,379 A | * | 3/1981 | Frankland, Jr. | 264/328.17 |
| 4,548,341 A | * | 10/1985 | Hambleton | 222/146.6 |
| 4,657,499 A | | 4/1987 | Lewellen et al. | 425/208 |
| 4,673,438 A | | 6/1987 | Wittwer et al. | 106/126 |
| 4,738,724 A | | 4/1988 | Wittwer et al. | 106/213 |
| 4,738,817 A | | 4/1988 | Wittwer et al. | 264/328.14 |
| 4,900,361 A | | 2/1990 | Sachetto et al. | 106/213 |
| 5,095,054 A | | 3/1992 | Lay et al. | 524/47 |
| 5,200,212 A | | 4/1993 | Axelrod | 426/2 |
| 5,240,720 A | | 8/1993 | Axelrod | 426/2 |
| 5,310,541 A | | 5/1994 | Montgomery | |
| 5,339,771 A | | 8/1994 | Axelrod | 119/710 |
| 5,382,611 A | | 1/1995 | Stepto et al. | 524/47 |
| 5,405,564 A | | 4/1995 | Stepto et al. | 264/115 |
| 5,419,283 A | * | 5/1995 | Leo | 119/709 |
| 5,427,614 A | | 6/1995 | Wittwer et al. | 106/213 |
| 5,635,237 A | | 6/1997 | Greenberg et al. | |

(Continued)

FOREIGN PATENT DOCUMENTS

CN    1263719    8/2000

(Continued)

OTHER PUBLICATIONS

Soy Natto. Soy Natto Food Company. Retrieved from http://www.soynatto.com/SoyAndNatto.html, on Jul. 25, 2005. 3 pages.

(Continued)

*Primary Examiner* — Drew E Becker
(74) *Attorney, Agent, or Firm* — Grossman, Tucker, Perreault & Pfleger, PLLC

(57) ABSTRACT

The present invention relates to an animal chew including a resin and a method of direct injection molding the animal chew using a modified screw. The screw may incorporate, for example, additional flights or a larger transition zone. Additionally, the particle size of the resin may be less than 2000 microns.

8 Claims, 3 Drawing Sheets

U.S. PATENT DOCUMENTS

| | | | |
|---|---|---|---|
| 5,769,267 A | 6/1998 | Duynslager et al. | 220/691 |
| 5,827,565 A | 10/1998 | Axelrod | 426/623 |
| 5,872,104 A | 2/1999 | Vermeulen et al. | 514/29 |
| 5,900,444 A | 5/1999 | Zamore | 522/137 |
| 5,922,379 A | 7/1999 | Wang | 426/138 |
| 5,941,197 A | 8/1999 | Axelrod | 119/710 |
| 6,056,991 A * | 5/2000 | Axelrod | 426/644 |
| 6,067,941 A | 5/2000 | Axelrod | 119/707 |
| 6,086,940 A | 7/2000 | Axelrod | 426/623 |
| 6,093,427 A | 7/2000 | Axelrod | 426/104 |
| 6,093,441 A | 7/2000 | Axelrod | 426/632 |
| 6,110,521 A * | 8/2000 | Axelrod | 426/549 |
| 6,126,978 A | 10/2000 | Axelrod | 426/285 |
| 6,159,516 A * | 12/2000 | Axelrod et al. | 426/456 |
| 6,165,474 A | 12/2000 | Frudakis et al. | 424/195.1 |
| 6,178,922 B1 | 1/2001 | Denesuk et al. | 119/710 |
| 6,180,161 B1 | 1/2001 | Axelrod | 426/623 |
| 6,200,616 B1 | 3/2001 | Axelrod et al. | 426/285 |
| 6,231,970 B1 | 5/2001 | Andersen et al. | |
| 6,274,182 B1 | 8/2001 | Axelrod et al. | 426/132 |
| 6,277,420 B1 | 8/2001 | Andersen et al. | 426/92 |
| 6,379,725 B1 | 4/2002 | Wang et al. | 426/72 |
| 6,455,083 B1 * | 9/2002 | Wang | 426/104 |
| 6,576,246 B1 | 6/2003 | Denesuk et al. | 424/400 |
| 6,586,027 B2 | 7/2003 | Axelrod et al. | 426/132 |
| 6,596,818 B1 | 7/2003 | Zamore | 525/426 |
| 6,601,539 B1 | 8/2003 | Snook | 119/710 |
| 6,672,252 B2 * | 1/2004 | Levin et al. | 119/709 |
| 6,916,497 B2 | 7/2005 | Axelrod et al. | 426/132 |
| 6,990,927 B2 | 1/2006 | Axelrod | |
| 7,156,550 B2 * | 1/2007 | Womer et al. | 366/88 |
| 7,390,520 B2 * | 6/2008 | Dempsey et al. | 426/516 |
| 2002/0119224 A1 | 8/2002 | Axelrod et al. | |
| 2002/0172752 A1 | 11/2002 | Chizmas | |
| 2003/0219516 A1 * | 11/2003 | Pater et al. | 426/132 |
| 2004/0170732 A1 * | 9/2004 | Axelrod et al. | 426/516 |
| 2005/0139167 A1 * | 6/2005 | Leo | 119/710 |
| 2006/0000424 A1 | 1/2006 | Axelrod | |
| 2006/0004193 A1 | 1/2006 | Muller et al. | |
| 2006/0018186 A1 | 1/2006 | Womer et al. | |
| 2006/0191423 A1 * | 8/2006 | Nie et al. | 99/353 |

FOREIGN PATENT DOCUMENTS

| | | |
|---|---|---|
| CN | 1413084 | 4/2003 |
| CN | 1646008 | 7/2005 |
| EP | 1602285 | 12/2005 |
| IE | 970930 | 6/1999 |
| IN | 200400392 I4 | 2/2006 |
| JP | 11-56261 | 3/1999 |
| WO | 01/45517 | 6/2001 |
| WO | 03/088740 | 10/2003 |
| WO | 2004/073612 A2 | 9/2004 |

OTHER PUBLICATIONS

Soynatto Fermented Soyfood. Bio-Foods, Ltd. Retrieved from http://www.biofoodsltd.com/Soynatto.htm, on Jul. 25, 2005. 4 pages.

Powder Coatings Particle Size Table. Rohm and Haas. Retrieved from http://www.rohmhaas.com/powdercoatings/tech/particle_size.html, on Oct. 10, 2005. 2 pages.

Design Tools—Surface Finish Charts. L.J. Star Incorporated. Retrieved from http://www.ljstar.com/designtools_/surface_finish_charts.asp, on Oct. 12, 2005. 3 pages.

Surface Roughness Finish Comparison Chart. Engineers Edge. Retrieved from http://www.engineersedge.com/surface_finish.htm, on Oct. 12, 2005. 1 page.

GEMSTAR 100 Wheat Starch Product Data Sheet. Manildra Group USA. 1 page.

GEMSTAR 100+ Wheat Starch Product Data Sheet. Manildra Group USA. 1 page.

GEM of the West Vital Wheat Gluten Product Data Sheet. Manildra Group USA. 1 page.

Organic Gem of the West Vital Wheat Gluten Product Data Sheet. Manildra Group USA. 1 page.

Organic Gemstar 100 Wheat Starch Product Data Sheet. Manildra Group USA. 1 page.

Organic Gemgel 100 Pregelatinized Wheat Starch Product Data Sheet. Manildra Group USA. 1 page.

Edigel 100 Wheat Starch Product Data Sheet. ADM, a Division of Archer Daniels Midland Company. 1 page.

Aytex P Wheat Starch Product Data Sheet. ADM, a Division of Archer Daniels Midland Company. 1 page.

English translation of Office Action from corresponding Chinese Application No. 200680032245.6 dated Mar. 8, 2011.

Search Report and Written Opinion from corresponding EPO Application No. 06800841.6 dated Mar. 8, 2012.

* cited by examiner

DIRECT MELT PROCESSING OF RESINS

RELATED APPLICATIONS

This application is a continuation in part of U.S. application Ser. No. 11/198,881 filed Aug. 5, 2005.

FIELD OF INVENTION

The present invention relates to the formation of an animal chew composition. More particularly, the present invention is directed at direct injection molding of resins as well as a modified screw design utilized in melt processing of resins suitable for forming an animal chew, such as an edible dog chew.

BACKGROUND

Numerous disclosures exist pertaining to the development of edible dog chews that are digestible and/or nutritious along with a texture that can be individually adjusted to suit a wide variety of a dog's preferences or needs. Attention is therefore directed to the following exemplary disclosures: U.S. Pat. No. 6,180,161 "Heat Modifiable Edible Dog Chew"; U.S. Pat. No. 6,159,516 "Method of Molding Edible Starch"; U.S. Pat. No. 6,126,978 "Edible Dog Chew"; U.S. Pat. No. 6,110,521 "Wheat and Casein Dog Chew with Modifiable Texture"; U.S. Pat. No. 6,093,441 "Heat Modifiable Peanut Dog Chew"; U.S. Pat. No. 6,093,427 "Vegetable Based Dog Chew"; U.S. Pat. No. 6,086,940 "High Starch Content Dog Chew"; U.S. Pat. No. 6,067,941 "Animal Chew"; U.S. Pat. No. 6,056,991 "Turkey and Rice Dog Chew With Modifiable Texture"; U.S. Pat. No. 5,941,197 "Carrot Based Dog Chew"; U.S. Pat. No. 5,827,565 "Process for Making an Edible Dog Chew"; U.S. Pat. No. 5,339,771 "Animal Chew Toy Containing Animal Meal"; U.S. Pat. No. 5,240,720 "Dog Chew with Modifiable Texture"; U.S. Pat. No. 5,200,212 "Dog Chew with Modifiable Texture." Attention is also directed to U.S. Pat. No. 6,165,474 entitled "Application for Patent for Nutriceutical Toy" and U.S. Pat. No. 5,419,283 entitled "Animal Chew Toy of Starch Material and Degradable Ethylene Copolymer". These disclosures provide non-limiting examples of starch based molding compositions and molding methods.

SUMMARY

An aspect of the present invention relates to a method for direct injection molding an animal chew using a modified screw. In method form the invention relates to the introduction of resin into an injection molding machine including a modified screw, where the modified screw includes a transition zone having a first length L1 and a feed zone having a second length L2, wherein L1>0.5*L2 and forming the resin into an animal chew.

The modified screw and/or barrel of the injection molding machine may be coated, which may impart a surface finish value "Ra" greater than 5 micro-inches. The modified screw may also include at least two flights on all or a portion of the screw.

Another aspect of the present invention relates to a method for direct injection molding an animal chew which has a particle size of less than about 2000 microns. The particles may also exhibit a particle size distribution and have a bulk density of between 30-50 lb/cubic foot. Furthermore, the resin may have a moisture content of between 1-20% by weight.

BRIEF DESCRIPTION OF DRAWINGS

Features and advantages of the present invention are set forth herein by description of embodiments consistent with the present invention, which description should be considered in conjunction with the accompanying drawings, wherein.

DETAILED DESCRIPTION

Figure 1:
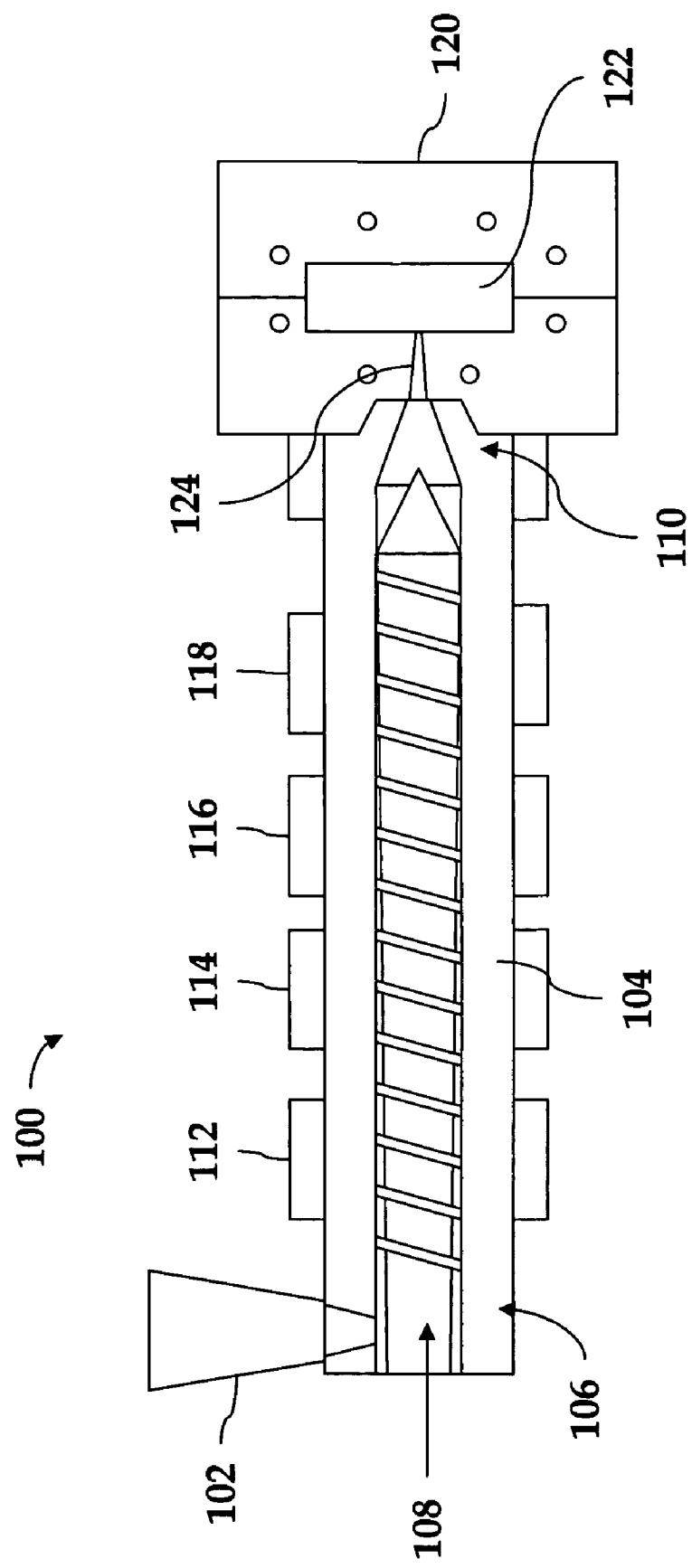
FIG. 1 is an exemplary embodiment of an injection molding machine.

The present invention relates to a modified screw design that may be utilized for the direct injection molding of resins suitable for forming animal chews. The modified screw design may be provided to increase shear and melt mixing of the resin. The resin may be an edible resin, such as starch. The resin may be of a controlled particle size, and may have a controlled level of moisture, so that the resin may be formed, upon exposure to one cycle of heat, into a desired shape.

The resin may have a particle size distribution wherein all or a portion of the particles are less than about 2.0 millimeters (mm), or 2000 microns, including all ranges of particle size that may be below 2000 microns. For example, the resin particle size may be less than about 500 microns and any value or range between 500 microns and 1 micron, including less than 250 microns, less than 149 microns, less than 44 microns, etc. In one embodiment, approximately greater than 95% of the particles are less than 149 microns and approximately greater than 60% of the particles are less than 44 microns. In another embodiment, approximately greater than 97% of the particles are less than 250 microns, and approximately greater than 75% of the particles are less than 149 microns. The resin may also have a bulk density of between 30-50 lb/cubic foot, including all increments and ranges there between such as between 40-45 lb/cubic foot, 38-40 lb/cubic foot, 35-38 lb/cubic foot, etc.

The resin may include any starch or carbohydrate of natural or vegetable origin. The starch may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassaya, konjac, kudzu, oca, sago, sorghum, sweet potato, taro, yams, fava beans, lentils and peas. The starch may be present in the resin composition between about 30-99% including all increments and values therebetween such as levels above about 50%, 85%, etc.

The starch employed herein may be raw starch, which may be understood as starch that has not seen a prior thermal molding history, such as extrusion or other type of melt processing step where the resin is shaped in the presence of heat. The raw starch itself may also be native, which may be understood as unmodified starch recovered in the original form by extraction and not physically or chemically modified. The raw starch may also be in powder form of varying particle size, as described above, which may be understood as milled and/or pre-sifted. It should be understood that the raw starch may also have varying degrees of moisture present. In one embodiment moisture may be present in the raw starch between 1-60%, including all increments and values therebetween such as 40%, 20%, 10%, etc. Accordingly, it should be appreciated that the term "direct" as used herein with respect to injection molding refers to the molding of resin (e.g. starch)

without exposing the resin to prior thermal molding histories before injection molding. However, the resin (e.g. starch) herein may, e.g., be heated for drying purposes, which would not amount to a prior thermal molding history.

The resin compositions herein may be sourced from Manildra Group USA, under the following tradenames: "GEMSTAR100" which is a refined food grade wheat starch; "GEMSTAR100+" which is a refined food grade wheat starch; "GEM OF THE WEST VITAL WHEAT GLUTEN" which is a powder product by low temperature drying of gluten extracted from wheat flour; "ORGANIC GEM OF THE WEST VITAL WHEAT GLUTEN" which is a powder product by low temperature drying of gluten extracted from organic wheat flour; "ORGANIC GEMSTAR100" which is a wheat starch extracted from organic what flour; and/or "ORGANIC GEMGEL100" which is a pregelatinized organic wheat starch In addition, the resin composition may be sourced from ADM under the tradename "EDIGEL100" which is a wheat resin composition; "AYTEX P" which is a unmodified food grade wheat starch.

Other resins may be contemplated as well. For example, the resin may be a thermoplastic or rubber material, such as nylon, polyurethane, polyesteramide, natural rubber, isoprene, neoprene, thermoplastic elastomers, etc. Other resin materials may be contemplated that may be derived from animal sources such as casein, denatured or hydrolyzed casein, collagen, denatured or hydrolyzed collagen, rawhide, gelatin, other animal protein products, such as animal meal. The resin material may also be derived from plant matter such as gluten, vegetable matter, nuts, such as nut flour, paste or bits, fruit matter, etc.

The resin may include cellulose. The cellulose may be, for example, a long-chain polymer of polysaccharide carbohydrate. The cellulose may also be derived or extracted from plants. The cellulose may be incorporated into the resin composition between about 1-15% by weight of the resin composition and any increment or value therebetween including 4%, 10%, 11%, etc.

Emulsifiers or surfactants may also be incorporated into the resin composition. The emulsifier may be present between about 1-10% by weight of the resin composition and all increments or values therebetween including 3%, 4%, etc. The emulsifier may include, for example, lecithin, which may be extracted or derived from, for example, egg yolk or soy beans.

The resin composition may also include a plasticizer. The plasticizer may include for example, glycerin. The plasticizer may be incorporated between about 15-30%, including all increments and values therebetween such as levels greater than 15%, 21%, 27% etc.

A humectant may also be incorporated into the resin composition. The humectant may include, for example, oat fiber. The humectant may be incorporated between about 0.1-5% by weight of the resin composition including all intervals and values therebetween, including 1%, 25%, etc. A humectant may be understood to be any additive that may absorb water in the material.

The resin composition may also include water. The water may be introduced into the composition between about 1-40% by weight of the resin composition and any increment or value therebetween, including 4%, 20-40%, 10-20%, etc. After the product has been formed, the water may be present between 1-20% by weight of the resin composition including all increments or values therebetween, such as, below 20%, 4%, 5-10%, etc.

The resin composition may include a nutraceutical. The nutraceutical may be fermented soya. Fermented soya nutraceuticals are available from Bio Food, Ltd., Pine Brook, N.J. and sold under the general trademark Soynatto®. The fermented soya is present between about 1-40% by weight of the resin composition, including all increments and values therebetween, including 10%, 20%, etc. The Soynatto® product is more specifically described to contain the following as compared to other available compositions:

| | | Made With | | | | Constituents* | | |
|---|---|---|---|---|---|---|---|---|
| Nutrient | Units per 100 g | IEFS | Soynatto ® | Tempeh | Miso Paste | Soy protein isolate | Soy milk as fluid | Tofu, regular |
| Proximates | | | | | | | | |
| Protein | g | 37.00 | 37.00 | 18.54 | 11.81 | 80.69 | 2.75 | 8.08 |
| Total lipid | g | 7.50 | 7.50 | 10.80 | 6.07 | 3.39 | 1.91 | 4.78 |
| Carbohydrate | g | 40.00 | 40.00 | 9.39 | 27.96 | 7.36 | 1.81 | 1.88 |
| Fiber, total dietary | g | 12.02 | 12.02 | | 5.40 | 5.60 | 1.30 | 0.30 |
| Minerals | | | | | | | | |
| Calcium | mg | 151.50 | 151.50 | 111.00 | 66.00 | 178.00 | 4.00 | 350.00 |
| Iron | mg | 5.21 | 5.21 | 2.70 | 2.74 | 14.50 | 0.58 | 5.36 |
| Magnesium | mg | 191.25 | 191.25 | 81.00 | 42.00 | 39.00 | 19.00 | 30.00 |
| Phosphorus | mg | 608.25 | 608.25 | 266.00 | 153.00 | 776.00 | 49.00 | 97.00 |
| Potassium | mg | 1957.50 | 1957.50 | 412.00 | 164.00 | 81.00 | 141.00 | 121.00 |
| Sodium | mg | 18.30 | 18.30 | 9.00 | 3647.00 | 1005.00 | 12.00 | 7.00 |
| Zinc | mg | 3.84 | 3.84 | 1.14 | 3.32 | 4.03 | 0.23 | 0.80 |
| Copper | mg | 3.93 | 3.93 | 0.56 | 0.44 | 1.60 | 0.12 | 0.19 |
| Manganese | mg | 2.40 | 2.40 | 1.30 | 0.86 | 1.49 | 0.17 | 0.61 |
| Selenium | mcg | 27.98 | 27.98 | 0.02 | 1.60 | 0.80 | 1.30 | 8.90 |
| Lithium | mcg | 60.00 | 60.00 | tr | tr | tr | tr | tr |
| Molybdenum | mcg | 6.00 | 6.00 | tr | tr | tr | tr | tr |
| Nickel | mcg | 30.00 | 30.00 | tr | tr | tr | tr | tr |
| Tin | mcg | 12.00 | 12.00 | tr | tr | tr | tr | tr |

-continued

| Nutrient | Made With Units per 100 g | Foods* IEFS | Soynatto ® | Tempeh | Miso Paste | Constituents* Soy protein isolate | Soy milk as fluid | Tofu, regular |
|---|---|---|---|---|---|---|---|---|
| Lipids | | | | | | | | |
| Fatty acids, saturated | g | 1.22 | 1.22 | 2.22 | 0.88 | 0.42 | 0.21 | 0.69 |
| Fatty acids, monounsaturated | g | 1.70 | 1.70 | 3.00 | 1.34 | 0.65 | 0.33 | 1.06 |
| Fatty acids, polyunsaturated | g | 4.14 | 4.14 | 3.83 | 3.43 | 1.65 | 0.83 | 2.70 |
| Omega-6 Fatty Acid | g | 3.57 | 3.57 | 3.59 | 3.02 | 1.45 | 0.74 | 2.38 |
| Omega-3 Fatty Acid | g | 0.55 | 0.55 | 0.22 | 0.41 | 0.20 | 0.10 | 0.32 |
| Vitamins | | | | | | | | |
| Thiamin | mg | 1.79 | 1.79 | 0.08 | 0.10 | 0.18 | 0.16 | 0.08 |
| Riboflavin | mg | 1.04 | 1.04 | 0.36 | 0.25 | 0.10 | 0.07 | 0.05 |
| Niacin | mg | 7.62 | 7.62 | 2.64 | 0.86 | 1.44 | 0.15 | 0.20 |
| Pantothenic acid | mg | 2.34 | 2.34 | 0.28 | 0.26 | 0.06 | 0.05 | 0.07 |
| Vitamin B-6 | mg | 0.99 | 0.99 | 0.22 | 0.22 | 0.10 | 0.04 | 0.05 |
| Folic | mcg | 532.50 | 532.50 | 23.90 | 33.00 | 176.10 | 1.50 | 15.00 |
| Vitamin A | IU | 30.00 | 30.00 | 0.00 | 87.00 | 0.00 | 32.00 | 85.00 |
| Vitamin E | mg_ATE | 0.15 | 0.15 | tr | 0.01 | 0.00 | 0.01 | tr |
| Biotin | mg | 0.02 | 0.02 | tr | tr | tr | tr | tr |
| Choline | mg | 60.00 | 60.00 | tr | tr | tr | tr | tr |
| Inositol | mg | 72.00 | 72.00 | tr | tr | tr | tr | tr |
| PABA | mg | 6.00 | 6.00 | tr | tr | tr | tr | tr |
| Special Nutrients | | | | | | | | |
| Isoflavones | mg | 4000.00 | 200.00 | 43.52 | 42.55 | 97.43 | 9.65 | 23.61 |
| Glycogen | g | 1.10 | 1.10 | tr | tr | tr | tr | tr |
| Beta Glucans | g | 0.50 | 0.50 | tr | tr | tr | tr | tr |
| Glutathione | mg | 60.00 | 60.00 | tr | tr | tr | tr | tr |
| SOD | unit | 1650.00 | 1650.00 | tr | tr | tr | tr | tr |
| RNA/DNA | g | 1.05 | 1.05 | | | | | |

An Empty Cell indicates a value is un-known; "tr" indicates a value is probably a trace or none.

As can be seen from the above, the Soynatto® product may provide proteins, minerals, and vitamins, in a fermented soy form. The fermentation process may infuse the product with *saccharomyces cerevisiae*, commonly known as "bakers yeast" or "brewers yeast." *Saccharomyces cerevisiae* is more traditionally known to ferment sugars present in flour or dough, yielding carbon dioxide and alcohol. Accordingly, it should be appreciated that a protein, one or more of a mineral, and one or more of a vitamin, along with *saccharomyces cerevisiae* may be present in the resin composition.

The fermented soy product herein may include increased concentrations of glycitein, daidzein and genistein, reportedly present at several hundred percent more than other more common soyfood sources. Glycitein, daidzein and genistein belong to the isoflavone class of flavanoids and may be classified as phytoestrogen, since they are plant derived nonsteriodal compounds that contain estrogen-like biological activity.

In the context of the present invention, the direct injection molding of the fermented soy product may offer advantages with respect to the activity of the soy product in a final molded shape. Specifically, the direct injection molding provides that the fermented soy product is not substantially degraded and the nutritional value of the fermented soy product remains substantially unchanged.

The resin composition may also include enzymes and/or co-enzymes which are similarly available through Bio Foods, Ltd., Pine Brook, N.J. and sold under the trademark of BT-CoQ10®. This reportedly is a biologically transformed (fermented) cell mitochondrial coenzyme and contains Coenzyme Q10, antioxidants, phytonetrients and cofactor mineral nutrients and other cell constituents. The enzymes and/or co-enzymes may be present between 0.1-10% by weight of the resin composition, including all increments and values therebetween such as 1%, 5%, etc.

Reportedly, the coenzyme Q10 is a fat-soluble compound primarily synthesized by the body and also consumed in the diet and is required for mitochondrial ATP synthesis. The fermented coenzyme also reportedly belongs to the family of compounds known as ubiquinones, which are either of two isomeric cyclic crystalline compounds $C_6H_4O_2$ that are di-keto derivatives of dihydro-benzene. It may also function as an antioxidant in cell membranes and lipoproteins.

Other additives may be introduced into the composition as well. These additives may include vegetable matter, fruit matter, rawhide, nuts, nut bits or nut flour such as peanut flour, and animal or fish products, by-products, meal or digests, etc. Glutens may also be incorporated into the resin composition. Gluten may be understood as water-insoluble protein complex extracted from cereal grains such as maize or corn and wheat. These additives may be present individually or cumulatively between about 0.1-50% by weight of the resin composition and all increments and values therebetween including 0.1-5.0%, 15%, 25%, etc.

Additionally, flavorants, herbs, herbal extracts, vitamins, minerals, colorants, yeast products, soy products, attractants, etc., may be incorporated into the resin composition. Yeast products may include nutritional yeast or brewers yeast such as *saccharomyces cerevisiae*, dairy yeast such as *kluyveromyce marxianus* or wine yeast such as *saccharomyces fer-*

*mentati*. The soy products may include fermented soy or other soy products, as listed in the table above. Attractants may include compounds listed herein, such as the animal or fish digests, or other compounds that may increase an animal's interest in the resin composition. These additives may be present individually or cumulatively between about 0.01-25% by weight of the resin composition and any increment or value therebetween including 0.01-0.5%, 10%, 20%, etc. The composition may also include calcium carbonate. The calcium carbonate may be present between about 5-10%.

The additives of the resin composition may be introduced directly into the barrel of an injection molding machine 100, illustrated in FIG. 1, through a hopper or other feeding device 102. Various feeding devices for introducing the additives into the injection molding barrel may be contemplated including loss-in weight gravimetric blenders/feeders, auger feeders, venturi loaders, etc. Those skilled in the art will appreciate that an injection molding machine 100 typically contains a barrel 104 including a feed section 106, a screw 108 and an output nozzle 110. The barrel 104 may include a plurality of temperature control zones 112, 114, 116, 118 in the barrel extending from the feed section 106 section to the nozzle 110. The injection molding machine may include a mold 120 having one or more cavities 122. The molding machine may also be vented, including a vented barrel and/or a vented mold.

The temperature adjustment may vary for each zone. For example, in one exemplary embodiment, the molding machine barrel may include 4 zones, zone 1 112 being the closest to the feed section 106 and zone 4 118 being the closest to the nozzle 110. Zone 1 112 may be set to less than about 150 degrees F., including any increment or value between about 35 to 150 degrees F. including between about 46 to 150 degrees F., 46 to 70 degrees F., etc. Similarly zone 2 114 may be set between about 70 to 150 degrees F. including any increment or value therebetween, zone 3 116 between about 50 to 300 degrees F. including any increment or value therebetween, and zone 4 118 between about 200 to 375 degrees F. including any increment or value therebetween. The nozzle 110 may be set between about 250 to 390 degrees F. including any increment or value therebetween. The bushing 124 inside of the mold 120 may be set between about 250 to 425 degrees F. including any increment or value therebetween and the mold 120 may also be set between about 35 to 65 degrees F. including any increment or value therebetween.

Once introduced into the barrel 104 of the molding machine 100 the resin and additives may be blended as the screw 108 conveys the material towards the mold 120 where the resin composition may be formed. The mold 120 may cool the resin composition. Once molded and venting takes place, the resin composition may include water between about 1-20% by weight of the resin composition, including all increments and values therebetween such as 10%, 15%, etc. The resin composition may be molded into any form capable of being produced in an injection molding cavity.

Figure 2A:
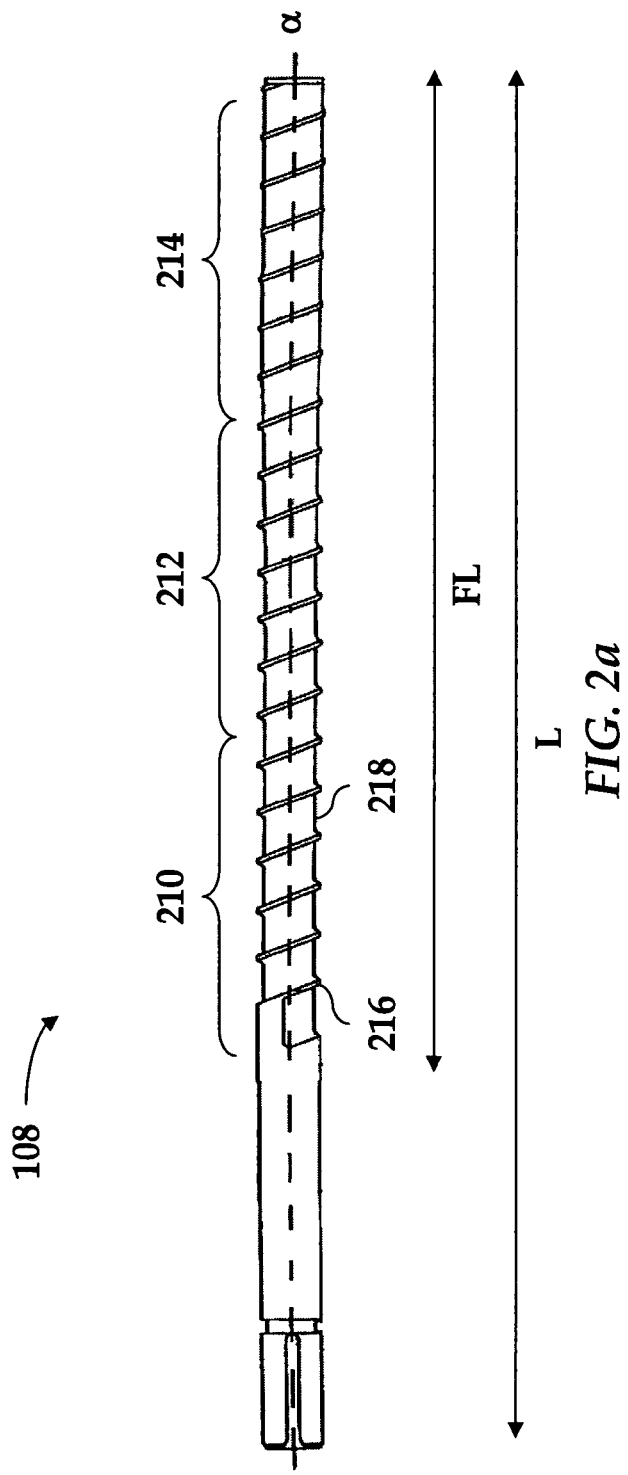
FIG. 2 is an exemplary embodiment of a screw.

The design of the screw 108 may also be varied to provide greater thermal and/or mechanical interaction with the resin composition. In particular, the screw may impart increased shear stress on the material. As illustrated in FIG. 2a the screw 108 may include a number of zones which extend along the length L of the screw. For example, the screw may include a feed zone 210, a transition zone 212 and a metering zone 214. The feed zone 210 may be proximate to the hopper or other feeding device 102 in the barrel 104 and the metering zone may be proximate to the nozzle 110. The feed zone therefore may function to convey solid material away from the feed section 106.

The length of the feed zone 210, the transition zone 212 and the metering zone 214 may be adjusted while maintaining the overall length L of the screw at the same size. The length of the feed zone 210 may be decreased and the length of the transition zone and/or the metering zone 212, 214 may be increased. The screw therefore may include a transition zone having a first length L1 and a feed zone having a second length L2, wherein $L1 > f*L2$. The metering zone may similarly have a length L3 wherein $L3 > f*L2$. In the previous equations, the value of "f" may be 0.5 and greater, such 0.6, 0.7 up to 10.0, including all incremental values therebetween.

Solids conveying in the screw may be improved by increasing the surface roughness of the internal barrel surface or the root surface of the screw. The increased roughness may cause an increase in the coefficient of friction between the resin composition and the barrel wall. Increasing the roughness may be accomplished by coating the surface of the screw and/or barrel wall. The surface roughness may have an Ra value of greater than about 5 micro-inches, including all ranges and increments above such as 9, 30, 42 etc. The variable "Ra" is an arithmetic mean and represents the average of all peaks and valleys. Lower numbers indicate a smoother finish.

Figure 2B:
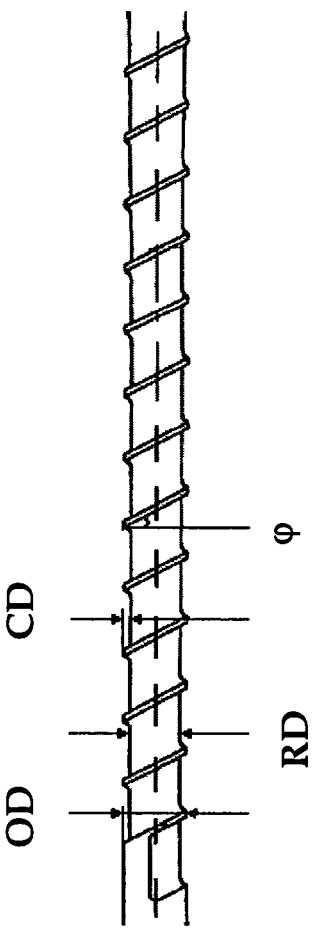

The screw 108 may also include one or more flights 216 wrapping helically around the axis α of the screw (shown in phantom) extending from the feed zone 210 to the metering zone 214. The flight 216 may define a plurality of channels 218. Referring to FIG. 2b, the screw 108 includes an outer diameter OD, defined by the surface of the flight and a root diameter RD defined by the channels forming the root of the screw. The channel depth CD is the distance between the top of a flight to the screw root. Either the outer diameter or the inner diameter may vary along the length of the screw. Stated another way, there may be a consistent reduction or increase in either the outer diameter OD or the root diameter RD of the screw. Alternatively, there may be random reductions and increases in either the outer diameter OD or root diameter RD along the screw length for purposes such as venting.

The screw may have a flighted length to diameter ratio of between 10:1 to 40:1. The flighted length of the screw FL is a general reference to the length of the screw incorporating a flight (or flights), illustrated in FIG. 2a. The diameter refers to the outer diameter of the screw OD (referring back to FIG. 2b). The flight may also have a helix angle φ of approximately 15.0-20.0 degrees, illustrated in FIG. 2b.

The compression ratio of the screw may also be increased. The compression ratio is a reference to the difference in channel depth between the feed zone and metering zone of the screw. In one embodiment, the compression ratio may be greater than about 2:1, including all increments and values above such as 3.5:1, 4:1 etc.

Figure 3:
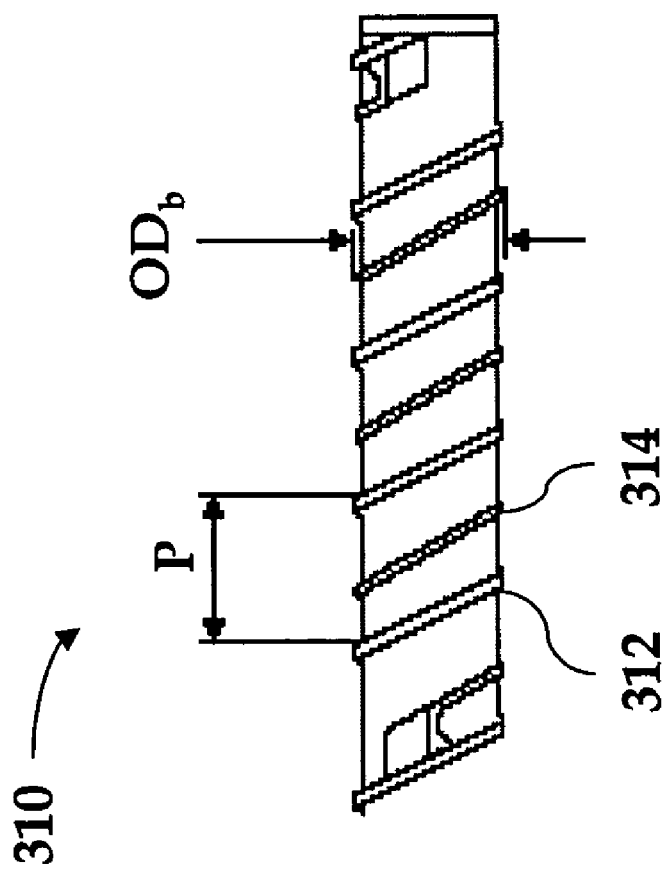
FIG. 3 is an exemplary embodiment of a portion of a screw including an additional flight.

Furthermore, the screw may include barrier flights and other mixing heads or flights. A barrier zone 310 is a reference herein to a portion of the screw having more than one flight, such as a main flight 312 and a barrier flight 314, as illustrated in FIG. 3. The main flight and the barrier flight may wrap around the screw concurrently.

The barrier flight may have a varying pitch P or the pitch may be similar to the main flight. Pitch P is a general reference to the axial distance between two points on the flight separated by a full turn of the screw. For example, the pitch Pb of the barrier flight may be greater than the pitch of the main flight Pm, wherein $Pb > d*Pm$, where d is greater than or about 1.01, including any increment or value above, such as 1.1, 1.5 etc.

The barrier flight may be undercut and have a smaller outer diameter ODb than the main flight allowing polymer melt to pass from one channel to the other. The solids may not pass over the flight until they are small enough or have been completely melted. For example, the barrier flight ODb may be less than the diameter of the main flight OD. Accordingly, the ODb may be equal to x*OD wherein x is 0.5-0.99. Furthermore, the ODb may be equal to the OD of the main flight.

The channel depth CD of the barrier flight may also be the same as the main flight or may differ from the main flight. For example, the channel depth of the barrier flight may be greater than the channel depth of the main flight or the channel depth may increase or decrease along the length of the screw. The barrier zone may extend the entire flighted length (FL illustrated in FIG. 2) of the screw or may extend along a portion of the screw, such as along the length of one or two of the zones, or along only a portion of a single zone.

Mixing heads, zones or flights may include dispersive mixing elements and distributive mixing elements. Dispersive mixing elements may be used to decrease agglomerates or gels. The mixing element may be fluted or splined. The splines or flutes may be arranged parallel, perpendicular or at an angle to the longitudinal screw axis α. The element may also be in the form of a blister ring.

Distributive mixing elements may be used to disrupt the velocity profiles of the material in the barrel. Pins of various sizes and geometries or small lands may be arranged radially about the axis of the screw including pin mixing sections or pineapple mixing sections. Slotted channels or narrow channels may also be employed or a cavity transfer mixing section. These elements may be used alone or in combination to provide adequate mixing of the polymer composition prior to exiting the barrel and entering the mold.

The foregoing description is provided to illustrate and explain the present invention. However, the description hereinabove should not be considered to limit the scope of the invention set forth in the claims appended here to.

What is claimed is:

1. A method for molding an animal chew comprising:
   introducing ingredients of a composition directly into an injection molding barrel of an injection molding machine, wherein said barrel houses a single screw comprising a modified single screw having a flight having a helix angle, said modified single screw comprising a transition zone having a first length L1 and a feed zone having a second length L2, wherein L1>0.5*L2 and a helix angle between about 15 and 20 degrees;
   wherein said ingredients comprise:
      raw starch which has not seen a prior thermal molding history including extrusion and any type of melt processing step, said raw starch having a controlled level of moisture and comprising unmodified starch recovered by extraction and which has not been physically or chemically altered, said raw starch having a particle size of 1-500 microns and wherein: (1) greater than 95% of the particles are less than 149 microns and 60% are less than 44 microns; or (2) greater than 97% of the particles are less than 250 microns and greater than 75% of the particles are less than 149 microns;
      water; and
      plasticizer;
   blending said ingredients with heat with said modified single screw in said barrel, thereby producing said composition in said injection molding barrel;
   providing a mold having at least one cavity to form the animal chew in open communication with said composition in said injection molding barrel; and
   conveying said composition with said screw from said injection molding barrel into said at least one cavity of said mold and forming on exposure to one cycle of heat said composition into the animal chew.

2. The method of claim 1 wherein said modified single screw further comprises a metering zone having a third length L3, wherein L3>0.5*L2.

3. The method of claim 2 wherein said feed zone has a first channel depth CD1 and said metering zone has a second channel depth CD2, wherein CD1>2.0*CD2.

4. The method of claim 1 wherein said composition further includes wheat gluten.

5. The method of claim 1 wherein said composition further includes a material derived from an animal source.

6. The method of claim 1 wherein said composition further includes a thermoplastic material.

7. The method of claim 1 wherein said composition further includes a rubber material.

8. The method of claim 1 wherein said composition further includes plant matter.

* * * * *